United States Patent
Lee et al.

(10) Patent No.: US 7,848,426 B2
(45) Date of Patent: Dec. 7, 2010

(54) MOTION VECTOR ESTIMATION METHOD AND ENCODING MODE DETERMINING METHOD

(75) Inventors: Yung-Iyul Lee, Seoul (KR); Il-Hong Shin, Daejeon (KR)

(73) Assignees: Samsung Electronics Co., Ltd., Suwon-si (KR); Sejong Industry-Academy Cooperation Foundation, Seoul (KR)

( * ) Notice: Subject to any disclaimer, the term of this patent is extended or adjusted under 35 U.S.C. 154(b) by 1213 days.

(21) Appl. No.: 11/015,277

(22) Filed: Dec. 20, 2004

(65) Prior Publication Data

US 2005/0152453 A1 Jul. 14, 2005

(30) Foreign Application Priority Data

Dec. 18, 2003 (KR) .................. 10-2003-0093157

(51) Int. Cl.
H04N 7/12 (2006.01)
H04N 11/02 (2006.01)
H04N 11/04 (2006.01)

(52) U.S. Cl. ..................... 375/240.16; 375/240.12; 375/240.24

(58) Field of Classification Search ............ 375/240.16, 375/240.24, 240.12
See application file for complete search history.

(56) References Cited

U.S. PATENT DOCUMENTS

| | | | |
|---|---|---|---|
| 5,642,170 A * | 6/1997 | Hackett et al. ............... 348/459 |
| 5,757,668 A | 5/1998 | Zhu | |
| 6,711,212 B1 * | 3/2004 | Lin ....................... 375/240.24 |
| 6,909,748 B2 * | 6/2005 | Dinerstein .............. 375/240.12 |
| 6,927,710 B2 * | 8/2005 | Linzer et al. ................. 341/107 |
| 7,251,279 B2 * | 7/2007 | Song ..................... 375/240.16 |
| 7,356,079 B2 * | 4/2008 | Laksono et al. ......... 375/240.03 |
| 7,391,809 B2 * | 6/2008 | Li et al. .................. 375/240.12 |
| 2001/0047517 A1 * | 11/2001 | Christopoulos et al. ....... 725/87 |
| 2003/0053709 A1 | 3/2003 | Olivieri | |
| 2004/0190616 A1 * | 9/2004 | Linzer et al. ........... 375/240.16 |

FOREIGN PATENT DOCUMENTS

| | | |
|---|---|---|
| JP | 2002-244927 A | 9/2000 |
| KE | 2002-0047525 B1 | 7/2002 |
| KR | 2002-0042166 B1 | 6/2002 |

* cited by examiner

*Primary Examiner*—Marsha D Banks Harold
*Assistant Examiner*—Jessica Roberts
(74) *Attorney, Agent, or Firm*—Sughrue Mion, PLLC (57) ABSTRACT

A motion vector estimation method and an encoding mode determining method for converting an input moving picture image into a compressed moving picture image suitable for a desired frame rate by re-determining a motion vector and a motion-compensated block type when the frame rate of the input moving picture image needs to be reduced. A method of estimating a motion vector of a motion vector of a macroblock of a current frame in a transcoder includes determining whether the motion vector of the macroblock of the current frame is created with reference to a macroblock of a dropped frame and estimating the motion vector of the macroblock of the current frame by tracing back a reference frame until an undropped frame is found, if the motion vector of the macroblock of the current frame is created with reference to the macroblock of the dropped frame.

9 Claims, 12 Drawing Sheets

REFERENCE FRAME

$meet_{condition} = 1$ $n = $ reference number of current block $mv = $ motion vector of current block $B_{type} = $ type of current MB $while(meet_{condition})$

{

$\quad (MV_{temp}, Ref_{temp}) = BAMVR(n, mv, B_{type})$ $\quad n = n + Ref_{temp}$ $\quad mv = mv + MV_{temp}$ $\quad if(Ref_n \div (N_{FrameSkip} + 1) \neq 0)$ $\quad\quad meet_{condition} = 0$

}

$Mv = mv$ $Ref = \left\lfloor \dfrac{n - N_{FrameSkip}}{N_{FrameSkip} + 1} \right\rfloor$

MOTION VECTOR ESTIMATION METHOD AND ENCODING MODE DETERMINING METHOD

CROSS REFERENCE TO RELATED APPLICATION

This application claims the priority of Korean Patent Application No. 2003-93157, filed on Dec. 18, 2003, in the Korean Intellectual Property Office, the disclosure of which is hereby incorporated by reference in its entirety.

BACKGROUND OF THE INVENTION

1. Field of the Invention

The present invention relates to conversion of compressed moving picture data, and more particularly, to a motion vector (MV) estimation method and an encoding mode determining method to convert an input compressed moving picture into another format suitable for a desired frame rate by determining a motion vector and a motion-compensated block type again when the frame rate of the input moving picture needs to be reduced.

2. Description of the Related Art

Several digital contents can be transmitted via various networks such as Internet, wireless networks, and cellular networks. Since these networks have different bandwidths, it is necessary to adapt the bitrates of video streams to bandwidths of the networks in order to be able to provide various multimedia application services through the networks. Rate control methods are often used for application services or encoders. However, in application services such as video on demand (VOD) services, source bitstreams are already compressed at a target bitrate. As a result, there may be no need to perform rate control, depending on the circumstances of the network.

Therefore, scalable video coding methods can be used instead of the rate control methods. The scalable video coding methods adapt the bitrates of video streams to the bandwidth of a network using useful features such as temporal and spatial scalability. However, when using the scalable video coding methods, rate-distortion performance of the scalable video coding methods is degraded because over-head bits are embedded in each scalable level.

To adapt the bitrate of data to be transmitted to the bandwidth of a network, original bitstreams are converted into lower bitrates and thus an effect similar to rate control can be obtained. Transcoders convert compressed data from one format to another. Most transcoders use spatial down-sampling and reduced frame rate transcoding to meet channel bandwidth. In particular, when a small mobile device is considered, it cannot decode the original bitstreams compressed with high frame rates because of low processing power and power consumption. Therefore, a method of changing a frame rate is required.

Also, to provide services such as VOD services, teleconferencing, and distance learning via various networks, a transcoding method and a transcoder that can properly change the frame rate of an image are required.

SUMMARY OF THE INVENTION

The present invention provides an MV estimation method using a reduced frame rate transcoder and block-adaptive MV resampling (BAMVR). The BAMVR is used when selecting a macroblock (MB) type and a reference frame that are to be used in an encoder frame buffer of the reduced frame rate transcoder.

The present invention also provides an encoding mode determining method that adopts rate-distortion optimization used in selecting an optimal MB type.

According to one exemplary embodiment of the present invention, there is provided a method of estimating a motion vector of a macroblock of a current frame in a transcoder, the method comprising (a) determining whether a motion vector of the macroblock of the current frame is created with reference to a macroblock of a dropped frame and (b) estimating the motion vector of the macroblock of the current frame by tracing back a reference frame until an undropped frame is found, if the motion vector of the macroblock of the current frame is created with reference to the macroblock of the dropped frame.

The transcoder performs transcoding that reduces a frame rate by dropping at least one frame.

According to another aspect of the present invention, there is provided a motion vector estimation method comprising decomposing a sub-block of a predetermined size into 4×4 blocks, wherein a macroblock is composed of a plurality of sub-blocks and if the 4×4 blocks overlap a reference frame, searching for a sub-block that overlaps the reference frame and estimating a motion vector of each of the 4×4 blocks based on an overlapping area and motion vector information of the overlapped sub-block.

For the decomposing of the sub-block, the sub-block is of a predetermined 8×8 block size.

In estimating the motion vector of each of the 4×4 blocks, the motion vector of each of the 4×4 blocks is estimated based on an averaged value of motion vectors of sub-blocks that overlap the 4×4 blocks and an averaged value of overlapping areas.

According to still another exemplary embodiment of the present invention, there is provided an encoding mode determining method comprising determining a P8×8 block type corresponding to a current macroblock and calculating a rate-distortion value of the macroblock using a 16×8 block, an 8×16 block, and a 16×16 block, comparing the calculated rate-distortion value calculated using the determined P8×8 block type and a rate-distortion value calculated by using an intra block type, and selecting one of the 16×8 block, the 8×16 block, and the 16×16 block.

The determining of the 8×8 block type comprises decomposing the macroblock into sub-blocks, calculating a motion vector of each of the sub-blocks, constructing the sub-blocks into 8×8, 8×4, 4×8, 16×8, 8×16, and 16×16 blocks and determining a new motion vector, and performing rate-distortion optimization in 8×8 block units and determining one P8×8 block type.

The sub-blocks are 4×4 blocks.

BRIEF DESCRIPTION OF THE DRAWINGS

The above and other aspects and advantages of the present invention will become more apparent by describing in detail an exemplary embodiment thereof with reference to the attached drawings in which.

DETAILED DESCRIPTION OF THE PREFERRED EMBODIMENT

The present invention will now be described more fully with reference to the accompanying drawings, in which an embodiment of the invention is shown. Throughout the drawings, like reference numerals are used to refer to like elements.

H.264 standards are made without consideration of interoperability with existing moving picture compression standards H.261, H.263, MPEG-2, and MPEG-4. Thus, H.264 and MPEG-4 have different features. For example, H.264 performs integer discrete cosine transform (DCT) in 4×4 block units, while MPEG-4 performs DCT in 8×8 block units. Also, H.264 uses a plurality of reference frames, variable block types for motion compensation (MC), universal variable length codes (UVLC) or context based adaptive binary arithmetic coding (CABAC), and normative rate-distortion optimization (RDO) that is used to determine an optimal MB type. In other words, H.264 determines a MB type to be used for motion estimation (ME) and MC and performs ME and MC using the determined MB type.

Figure 1:
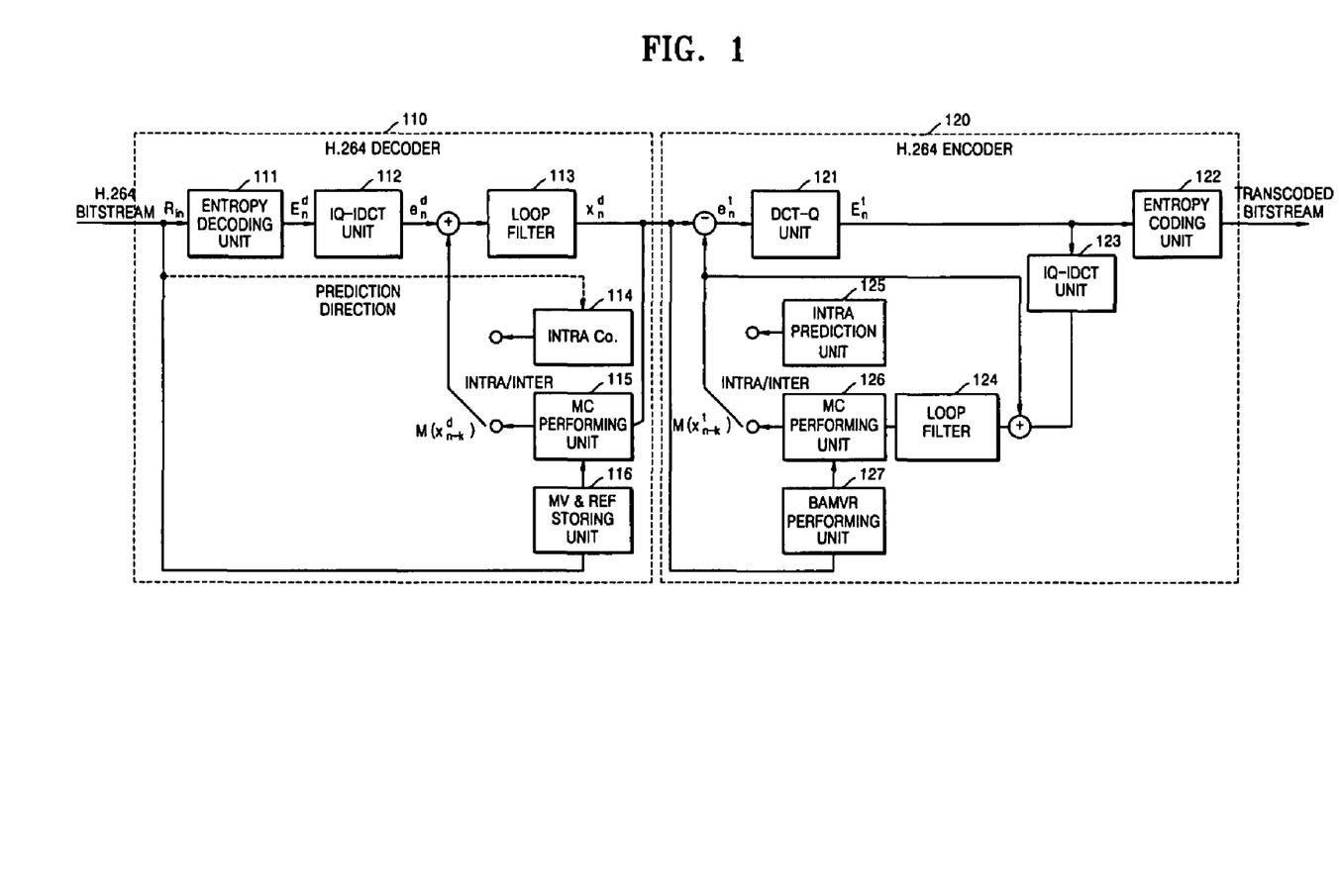
FIG. 1 is a block diagram of a transcoder according to a preferred embodiment of the present invention.

FIG. 1 is a block diagram of a transcoder according to a preferred embodiment of the present invention.

The transcoder of FIG. 1 performs BAMVR and includes a decoder 110 and an encoder 120. In this embodiment, the encoder 110 is an H.264 decoder and the encoder 120 is an H.264 encoder.

An H.264 bitstream $R_{in}$ input to the decoder 110 is entropy-decoded by a entropy decoding unit 111 and inverse-quantized and processed using inverse DCT (IDCT) by an IQ-IDCT unit 112. An output signal $e^d_n$ of the IQ-IDCT unit 112 is mixed with a motion-compensated signal $M(x^d_{n-k})$ output from an intra Co 114 or an MC performing unit 115 that is received via a motion vector (MV) & reference frame (Ref) storage unit 116, and the resultant signal is transmitted to a loop filter 113. The loop filter 113 performs edge smoothing of an MB in an image using low pass filtering and outputs a decoded signal $X^d_n$.

The decoded signal $X^d_n$ is input to the encoder 120. In the decoder 120, a DCT-Q unit 121 performs DCT and quantization, and an entropy coding unit 122 performs entropy coding. Thus, the decoded signal $X^d_n$ is output as H.264 bitstreams. Since the frame rate should be changed during encoding, a BAMVR performing unit 127 performs BAMVR on the decoded signal $X^d_n$. Motion vector information obtained through the BAMVR is received by an MC performing unit 126 and an intra prediction performing unit 125. As a result, a motion-compensated signal $M(x^t_{n-k})$ is produced, which is subtracted from an encoder input signal, and the resultant signal $e^t_n$ is transferred to the DCT-Q unit 121.

BAMVR is used for selecting a motion vector and reference frames by the encoder 120. In FIG. 1, signals $e^d_n$, $x^d_n$, and $e^t_n$, expressed in lower case letters, represent spatial domain signals and signals $R_{in}$, $E^d_n$, and $E^t_n$, expressed in upper case letters, represent 4×4 DCT domain signals. The signal $x^d_n$ output from the decoder 110 is given by $$x^d_n = Lp(e^d_n + \mathrm{Mc}(x^d_{n-k})), \qquad (1)$$

where $e^d_n$ is a signal obtained by inverse quantizing and performing IDCT on $E^d_n$, which is obtained by entropy decoding the H.264 bitstream $R_{in}$, $\mathrm{Mc}(x^d_{n-k})$ is a motion-compensated signal from the reference frames stored in the decoder 110, and Lp is a non-linear loop filter function. A superscript d represents a signal in a decoder, a subscript n is an index indicating a current frame to be encoded, and k is a reference frame index to be used for MC of the current frame. A residual signal, which is an error signal $e^t_n$ in an encoder is given by $$e^t_n = x^d_n - \mathrm{Mc}(x^t_{n-k}), \qquad (2)$$

where a superscript t represents a signal in an encoder. Substituting Equation 2 into Equation 1 yields $$e^t_n = Lp(e^d_n + \mathrm{Mc}(x^d_{n-k})) - \mathrm{Mc}(x^t_{n-k}) \qquad (3)$$

Therefore, the residual signal in the encoder 110 is composed of a difference signal equal to the difference between the reconstructed frame in the decoder 120 and motion-compensated frame in the encoder 110. However, the non-linear loop filter function has the following characteristic, $$Lp(e^d_n + \mathrm{Mc}(x^d_{n-k})) \ne Lp(e^d_n) + Lp(\mathrm{Mc}(x^d_{n-k})) \qquad (4)$$

Referring to Equation 4, since loop filtering has non-linear characteristics, linearity of reference frames in the encoder and decoder does not exist. Since the transcoder of FIG. 1 performs feedback and 4×4 integer DCT, a drift error or a mismatch error in IDCT does not occur. A drift error occurs when pixel values of the reference frames are changed by the accumulation of errors if ME/MC is performed in a DCT domain.

In the transcoder according to an exemplary embodiment of the present invention, the optimized motion vector and reference frame can be obtained by re-estimating a new motion vector. However, it is not desirable to perform motion vector estimation again in the transcoder due to high computational complexity of motion vector estimation. Therefore, a method of adaptively reconstructing a motion vector using a motion vector input to the decoder 120 of the transcoder is needed.

Figure 2:
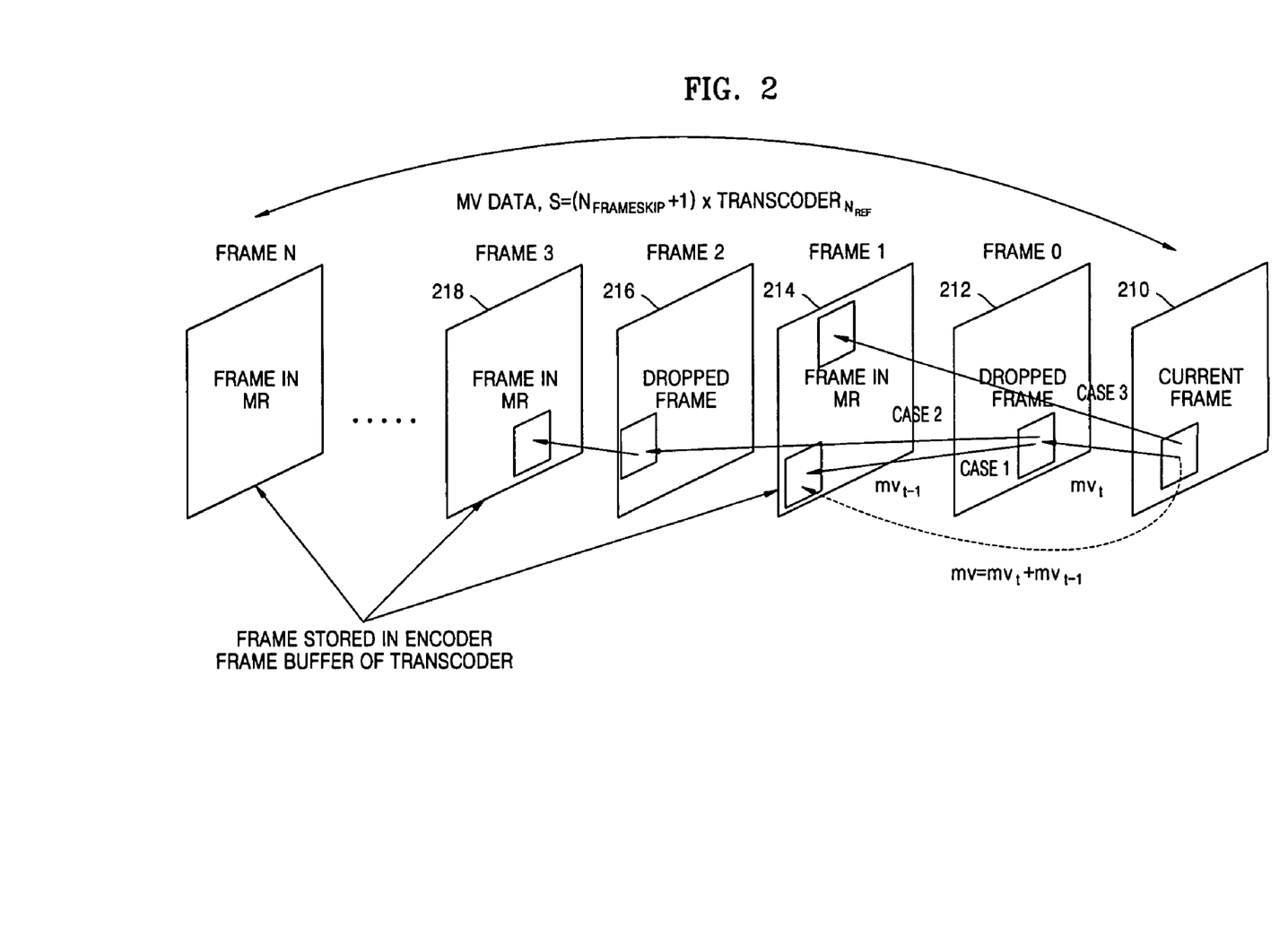
FIG. 2 is a view for explaining motion vector estimation in a reduced frame rate transcoder in which frames are skipped to reduce a frame rate.

FIG. 2 is a view for explaining motion vector estimation in a reduced frame rate transcoder using a frame-skipping method. Transcoder$_{N_{REF}}$ denotes the maximum number of reference frames in H.264 and $N_{FrameSkip}$ denotes the number of skipped frames in the transcoder, and the size S of memory required to store a motion vector for motion vector estimation is given by S=($N_{FrameSkip}$+1)×Transcoder$_{N_{REF}}$. The maximum number of reference frames in current H.264 standards is set to 5. For example, when $N_{FrameSkip}$ is set to 2, 2 frames are skipped and encoding is performed on every $3^{rd}$ frame. When $N_{FrameSkip}$ is set to 3, 3 frames are skipped and encoding is performed on every $4^{th}$ frame.

In H.264, a plurality of reference frames are used in the ME process in order to obtain better block-matched result. When using a plurality of reference frames, H.264 bitstreams can be error resilient. It is assumed that the original bitstream is compressed using a plurality of reference frames.

When a plurality of reference frames is used, the reduced frame rate transcoder meets the following three situations. As illustrated in FIG. 2, in a first case, a first motion vector of an MB of the current frame points to a dropped frame (frame 0) and a reference frame pointed to by a second motion vector of an MB of the dropped frame is frame 1 stored in an encoder frame buffer of the transcoder. In the first case, an overall motion vector and the number of reference frames are obtained by back tracking along the motion vectors and the number of reference frames stored in the encoder frame buffer of the transcoder.

In a second case, the motion vector of the MB in the dropped frame (frame 0) points to another dropped frame (frame 2) and the dropped frame is not stored in the encoder frame buffer. Thus, to use a new reference frame stored in the encoder frame buffer, a motion vector pointed by the motion vector of the MB in frame 2 is searched for and a motion vector in the current frame is created.

In a third case, the motion vector of the MB in the current frame points to frame 1, which is a reference frame stored in the encoder frame buffer. Thus, the motion vector and the number of reference frames are directly used for the motion vector of the current frame. The number of reference frames is determined in the same way as in calculation of the number of motion vectors.

Figure 3:
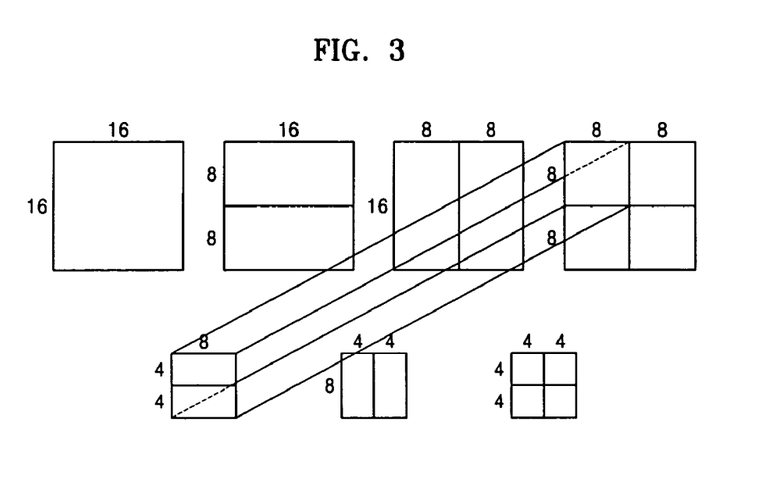
FIG. 3 illustrates a motion-compensated variable block according to H.264 standards.

FIG. 3 illustrates a motion-compensated variable block according to H.264 standards.

Referring to FIG. 3, H.264 has seven variable motion-compensated block types respectively being 16×16, 16×8, 8×16, 8×8, 8×4, 4×8, and 4×4 blocks. Thus, the number of motion vectors within one MB corresponds to the selected MB type. In other words, if a 16×8 motion-compensated block is used in one MB, two motion vectors are allocated to the MB. If an 8×8 motion-compensated block is used in an MB, four motion vectors are present in the MB.

Figure 4:
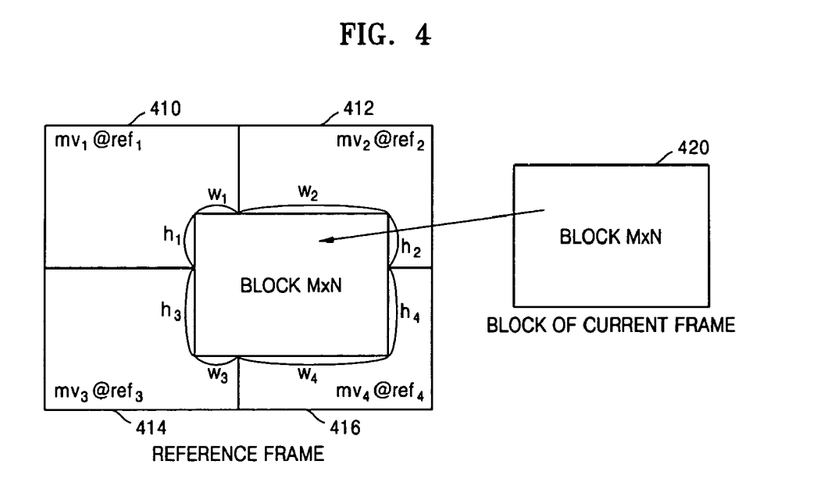
FIG. 4 is a view for explaining motion vector conversion of various motion-compensated block types.

FIG. 4 is a view for explaining motion vector conversion for various motion-compensated block types.

Referring to FIG. 4, when a motion vector of a current M×N block points to a reference block of a reference frame, a 2M×2N block (4 M×N blocks) is needed to trace back a new motion vector in the transcoder. Each of the M×N blocks of the reference frame points to a motion vector and a reference frame. In other words, an upper left block 410 has a motion vector $mv_1$ and a reference frame $ref_1$, an upper right block 412 has a motion vector $mv_2$ and a reference frame $ref_2$, a lower left block 414 has a motion vector $mv_3$ and a reference frame $ref_3$, and a lower right block 416 has a motion vector $mv_4$ and a reference frame $ref_4$.

Figure 5:
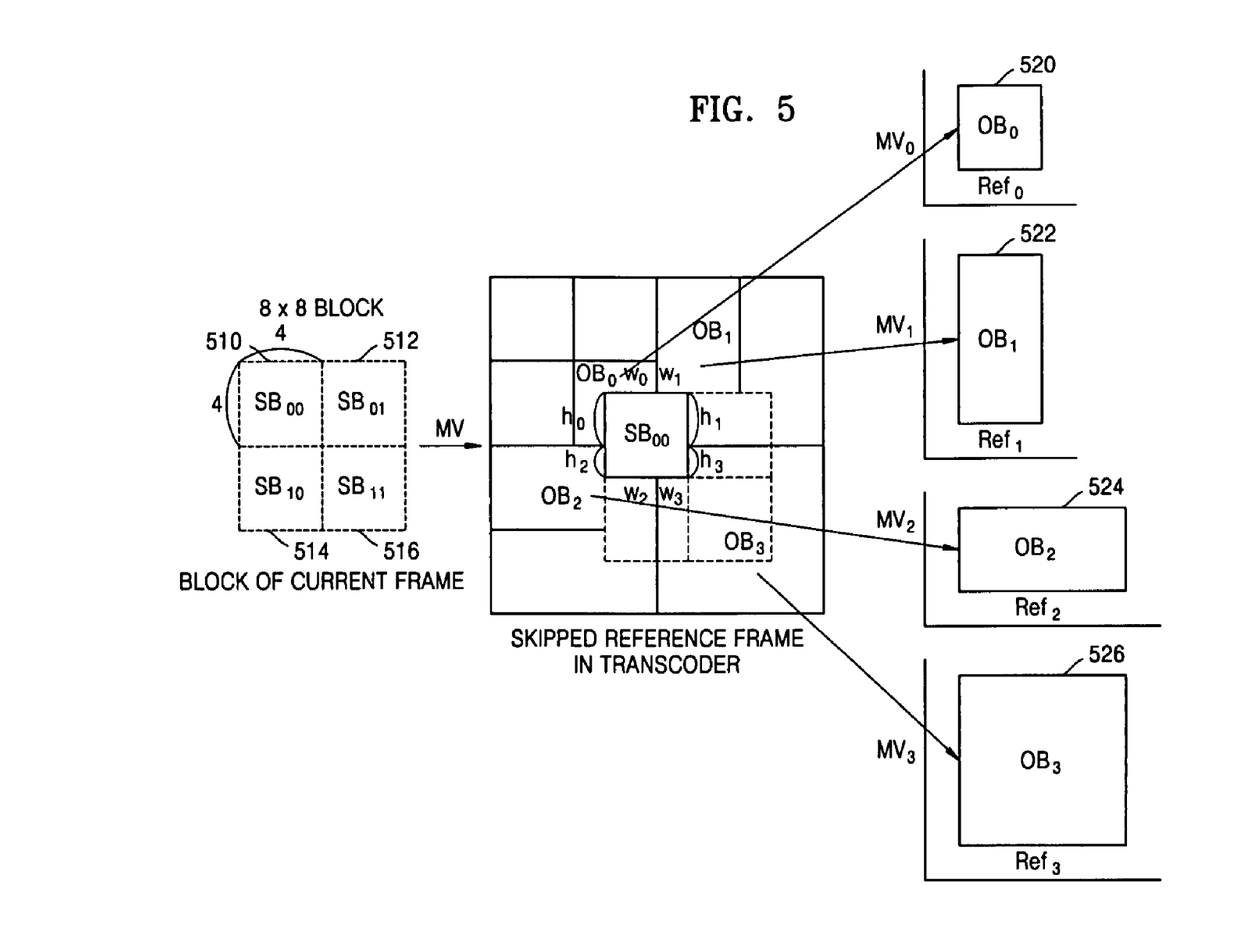
FIG. 5 is a view for explaining calculation of a motion vector and reference frames in an 8×8 block composed of four 4×4 blocks.

FIG. 5 is a view for explaining calculation of a motion vector and reference frames in an 8×8 block including four 4×4 blocks.

It is assumed that an 8×8 block is composed of four 4×4 blocks $SB_{00}$ 510, $SB_{01}$ 512, $SB_{10}$ 514, and $SB_{11}$ 516. As shown in FIG. 5, in H.264, the reference block may have an MB type that is different from the current MB type. For example, referring to FIG. 5, an upper left block is composed of four 4×4 blocks, an upper right block is composed of two 4×8 blocks, a lower left block is composed of two 8×4 blocks, and a lower right block is composed of an 8×8 block. For example, the 4×4 block $SB_{00}$ 510 is overlapped by four blocks included in the reference frame, i.e., $SB_0$ 520, $OB_1$ 522, $OB_2$ 524, and $OB_3$ 526. The motion vector and the number of reference frames in $SB_{00}$ 510 are estimated by averaging motion vectors $MV_0$, $MV_1$, $MV_2$, and $MV_3$, and the numbers of reference frames in the OB blocks $Ref_0$, $Ref_1$, $Ref_2$, and $Ref_3$.

In H.264, the MB type in each frame widely varies. Therefore, tracing of the motion vector in each MB type is difficult due to various overlapping regions and an arbitrary number of reference frames in one MB. To solve this problem, the smallest 4×4 block type in an M×N block is used to trace the motion vector. Tracing of each motion vector and the number of reference frames in one MB can be efficiently performed by using a 4×4 block. Each 4×4 block has a motion vector $mv_i$ and a number of reference frames $ref_i$. The motion vector and the number of reference frames are given by $$\beta_i = f(type_i) \times (h_i \times w_i) \quad (5)$$

$$MV_{kj} = \frac{\sum_{i=1}^{4} \beta_i \times MV_i}{\sum_{i=1}^{4} \beta_i}$$

$$Ref_{kj} = \frac{\sum_{i=1}^{4} \beta_i \times Ref_i}{\sum_{i=1}^{4} \beta_i},$$

where $f(type_i)$ represents an area of the $i^{th}$ block, k and j represent horizontal and vertical indices in 4×4 block unit of an MB, and i represents the overlapping region of a current block in a reference frame. The selection of a motion vector and a reference frame is calculated by bilinear weighting. Since large blocks dominate frame information in adjacent blocks, the function $f(type_i)$ is added as an weighting factor, and an adaptive motion vector and a number of reference frames which are composed of corresponding blocks in the current block are given by $$MV = \frac{\sum_{k=0}^{\frac{M}{4}} \sum_{j=0}^{\frac{N}{4}} \alpha_{kj} \times Mv_{kj}}{\sum_{k=0}^{\frac{M}{4}} \sum_{j=0}^{\frac{N}{4}} \alpha_{kj}} \quad (6)$$

$$Ref = \frac{\sum_{k=0}^{\frac{M}{4}} \sum_{j=0}^{\frac{N}{4}} \alpha_{kj} \times Ref_{kj}}{\sum_{k=0}^{\frac{M}{4}} \sum_{j=0}^{\frac{N}{4}} \alpha_{kj}}$$

where M and N (M, N=0, 4, 8, 12) represent maximum horizontal and vertical block indices of 4×4 block unit in a current MB, respectively, and the weighting factor $\alpha_{kj}$ is set to 1. BAMVR is a motion vector mapping process combined with reference frame selection to skip ME in a frame buffer of the transcoder.

Figure 6:
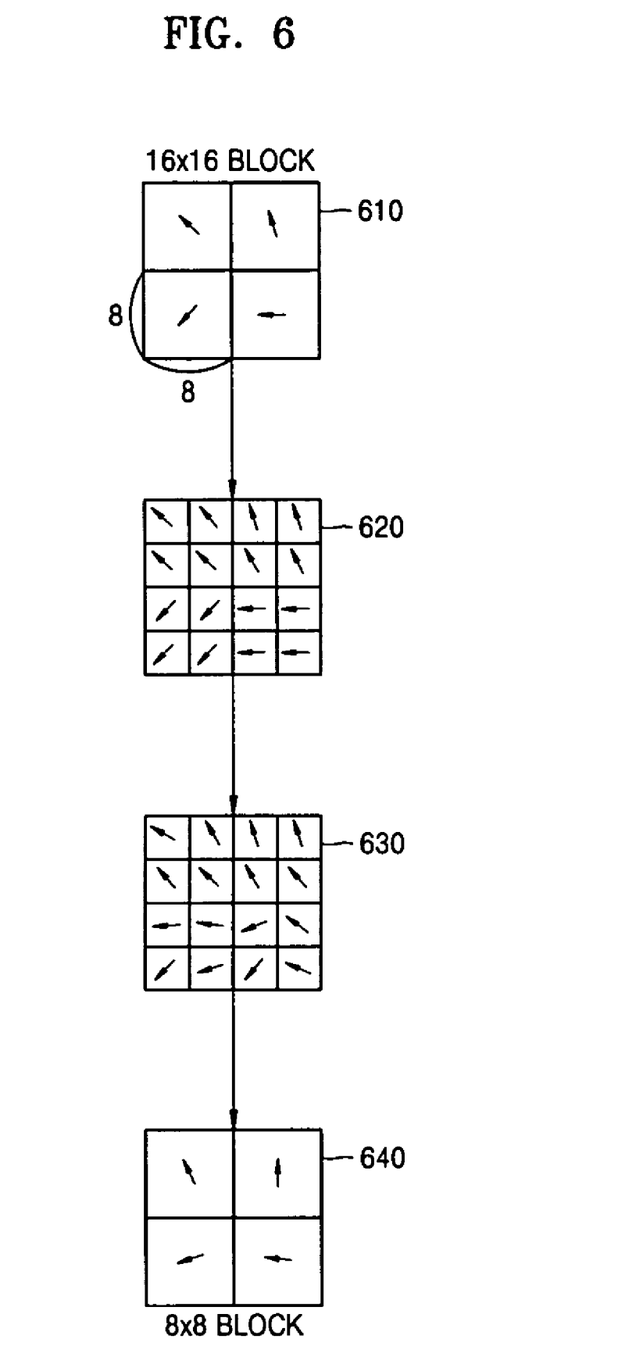
FIG. 6 illustrates a method of constructing motion vectors for a plurality of types using block-adaptive MV resampling (BAMVR) according to an embodiment of the present invention.

FIG. 6 illustrates a method of constructing a motion vector for each block type using BAMVR according to an exemplary embodiment of the present invention.

In FIG. 6, an arrow indicates a direction and magnitude of a motion vector. First, motion vector and reference frame information for each 8×8 block of a 16×16 block decomposed into four 8×8 blocks is received from the 16×16 block (610). Then, each 8×8 block is decomposed into four 4×4 blocks (620). The motion vector and number of reference frames of each 8×8 block are copied to four 4×4 blocks. BAMVR based on tracing of motion vectors and numbers of reference frames using 4×4 segments is performed for each of the 4×4 blocks. In other words, the motion vector and number of reference frames of each 4×4 block are estimated using Equation 5 (630). The weighting factor is added and the adaptive motion vector and number of reference frames composed of corresponding block type of the current block are calculated using Equation 6 (640).

Figure 7:
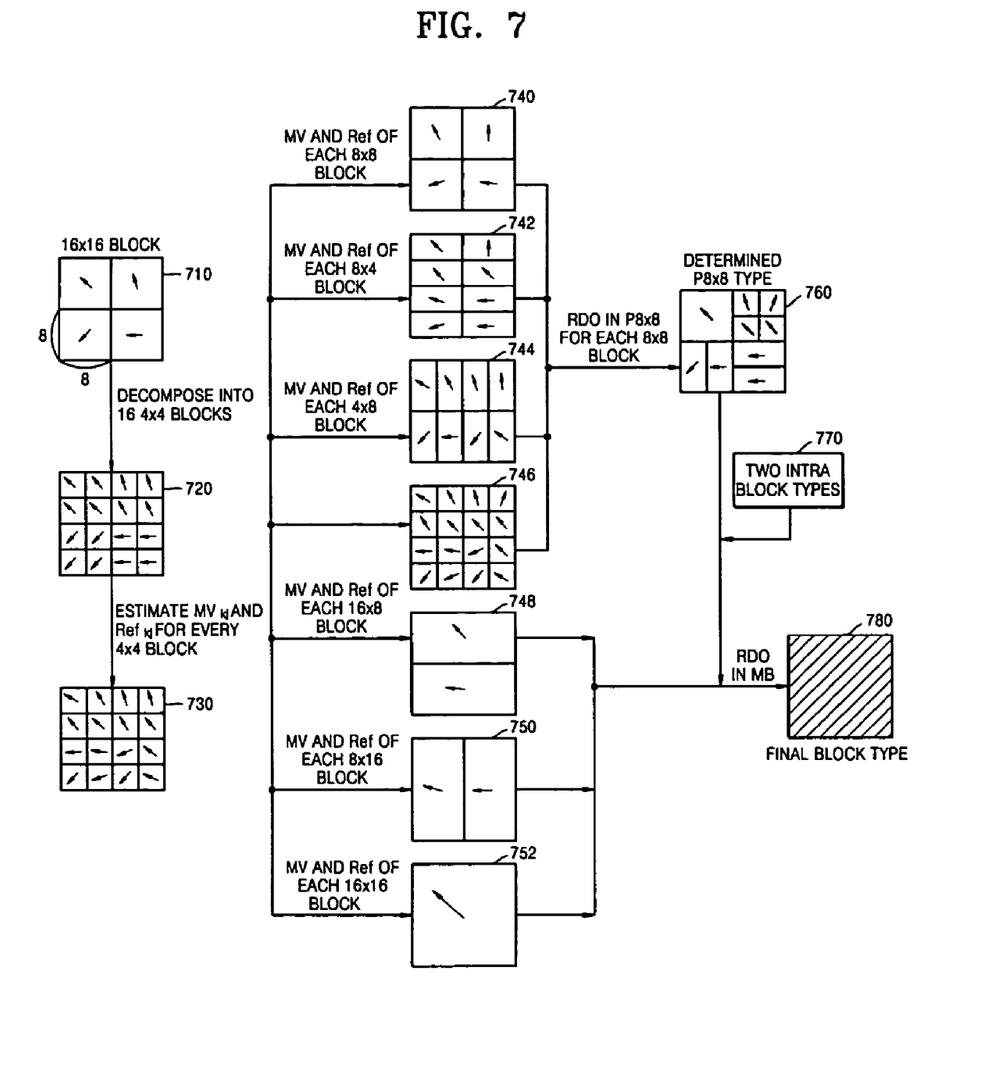
FIG. 7 illustrates a method of calculating a motion vector and the number of reference frames using BAMVR according to an embodiment of the present invention.

FIG. 7 illustrates a method of calculating a motion vector and the number of reference frames using BAMVR according to an exemplary embodiment of the present invention.

In FIG. 7, calculation of the motion vector and number of reference frames is shown in 8×8, 8×4, 4×8, and 4×4 block types. As shown in FIG. 6, a 16×16 block is decomposed into four 8×8 blocks and motion vector and reference frame information for each of the 8×8 blocks is received from the 16×16 block decomposed into four 8×8 blocks (710). Each 8×8 block is decomposed into four 4×4 blocks (720). Next, the motion vector and number of reference frames of each 4×4 block are calculated using Equation 5 (730).

The motion vector and number of reference frames for each of an 8×8 block 740, an 8×4 block 742, a 4×8 block 744, a 4×4 block 746, a 16×8 block 748, an 8×16 block 750, and a 16×16 block 752 are calculated to select an optimal block type from among seven block types and two intra block types. In this way, a P8×8 type is determined. For example, if a block type of 760 is selected, rate-distortion in each of the block type 760, two intra block types 770, the 16×8 block 748, the 8×16 block 750, and the 16×16 block 752 is calculated, thereby determining a final block type 780.

Figure 8:
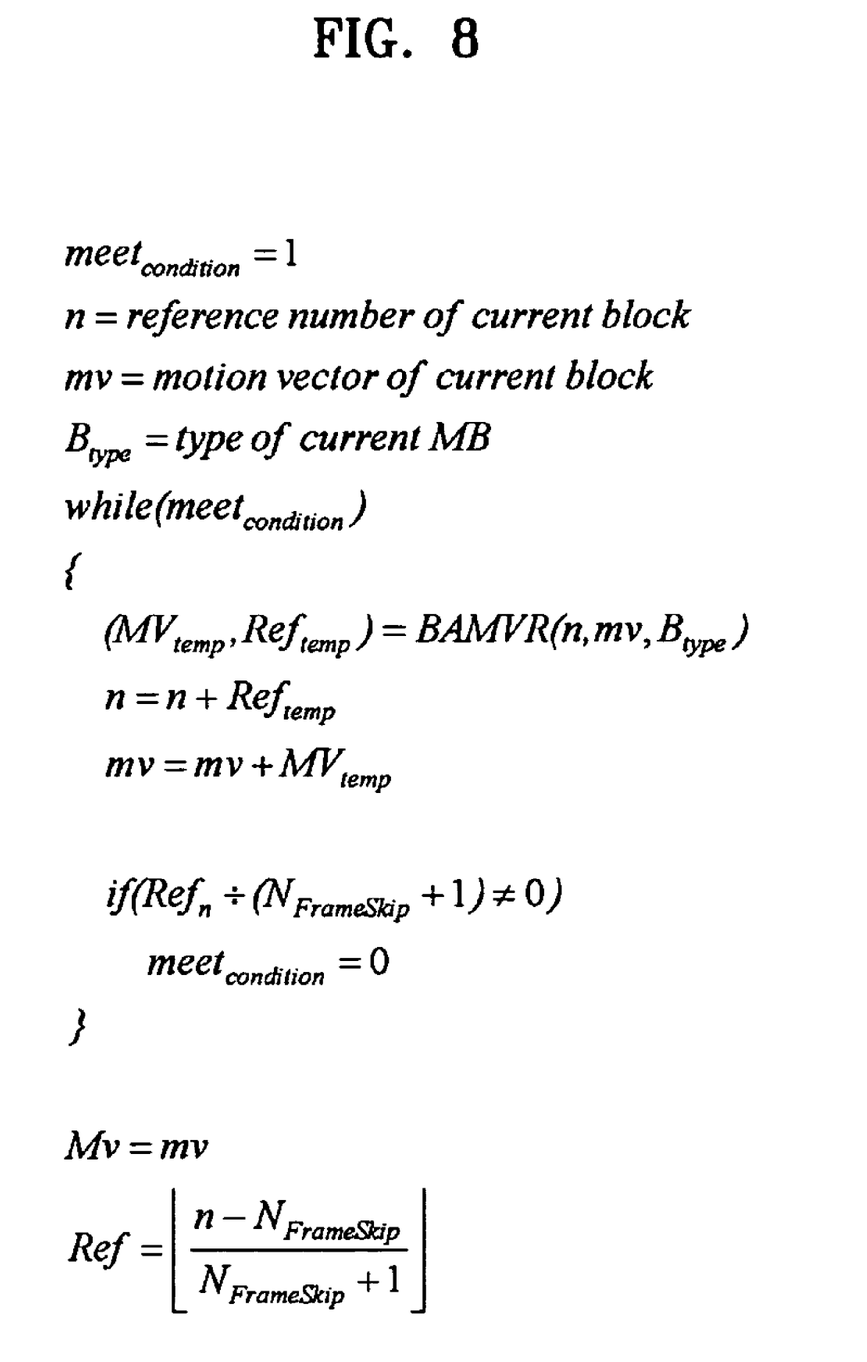
FIG. 8 illustrates pseudo code that implements the BAMVR according to an exemplary embodiment of the present invention using a frame-skipping method.

FIG. 8 illustrates pseudo code that implements the BAMVR according to an exemplary embodiment of the present invention using the frame-skipping method.

In the pseudo code, Mv and Ref represent transcoded motion vector and the number of reference frames, respectively, and ÷ represents a modulo operator. Motion vectors are accumulated until the frame buffer of the transcoder is full. All of the frames are stored in the frame buffer. The number of reference frames is determined by considering the number of skipped frames in the last part of the pseudo code. Here, $\lfloor x \rfloor$ represents an operator that calculates an integer nearest to x.

Rate-distortion optimization using BAMVR will now be described. The BAMVR according to an exemplary embodiment of the present invention encodes a current block using an input motion vector and a current MB type. Thus, a transcoded MB type is the same as an input MB type. When the difference between quantization parameter (QP) values in the decoder and encoder of the transcoder is large, the input MB type cannot be directly input to the encoder because of different characteristics of rate and distortion.

In general, large motion-compensated blocks have low peak signal-to-noise ratio (PSNR) and low bitrates compared to small motion-compensated blocks. When the input MB type is a small motion-compensated block (e.g., 4×4) with a large QP value, the transcoded rate-distortion performance with direct use of the input MB type is not optimal for the current MB type. A relative weight of rate in Equation 7 is more important than distortion with a large QP value, and thus, small motion-compensated blocks at low bitrates are not suitable for the MB type of the transcoded MB. Also, the direct use of the input MB type results in degraded visual quality. An equation used for rate-distortion optimization is $$D(s,c,\text{MODE}|QP) + \lambda_{MODE} R(s,c,\text{MODE}|QP) \quad (7),$$

where s represents a current MB signal coded by universal variable length coding (UVLC), c represents a current MB signal coded by context-adaptive binary arithmetic coding (CABAC), MODE represents the MB type to be selected, QP (Quantization Parameter) represents a quantization parameter between 0 and 51, D represents distortion, R represents bitrates including for header information, motion vectors bits, and texture bits. In other words, R represents the total number of bits required for coding an MB. XMODE is given by $$\lambda_{MODE} = 0.85 \times 2^{\frac{QP}{3}}, \quad (8)$$

To improve the rate-distortion and visual quality in the transcoder, the rate-distortion optimization should be performed. The optimal MB type is selected by performing the rate-distortion optimization for each MB in such a way that the rate-distortion function defined by Equation 7 is minimized.

In the rate-distortion optimization, the selected MB type in the intra frame is either INTRA4×4 or INTRA16×16. The selected MB type in an inter frame is either intra 4×4, intra 16×16, skip, 16×16, 16×8, 8×16, and P8×8. The QP is used to select the MB type. Equation 7, i.e., rate-distortion optimization, is to used determine the optimal MB type for a given bitrate. The BAMVR according to an exemplary embodiment of the present invention produces the MV and number of reference frames with rate-distortion optimization. The BAMVR for tracing back the smallest block type (4×4) is useful for composing a variable block type in one MB, and since the smallest block type is used, it is possible to reduce unnecessary computation.

Figure 9:
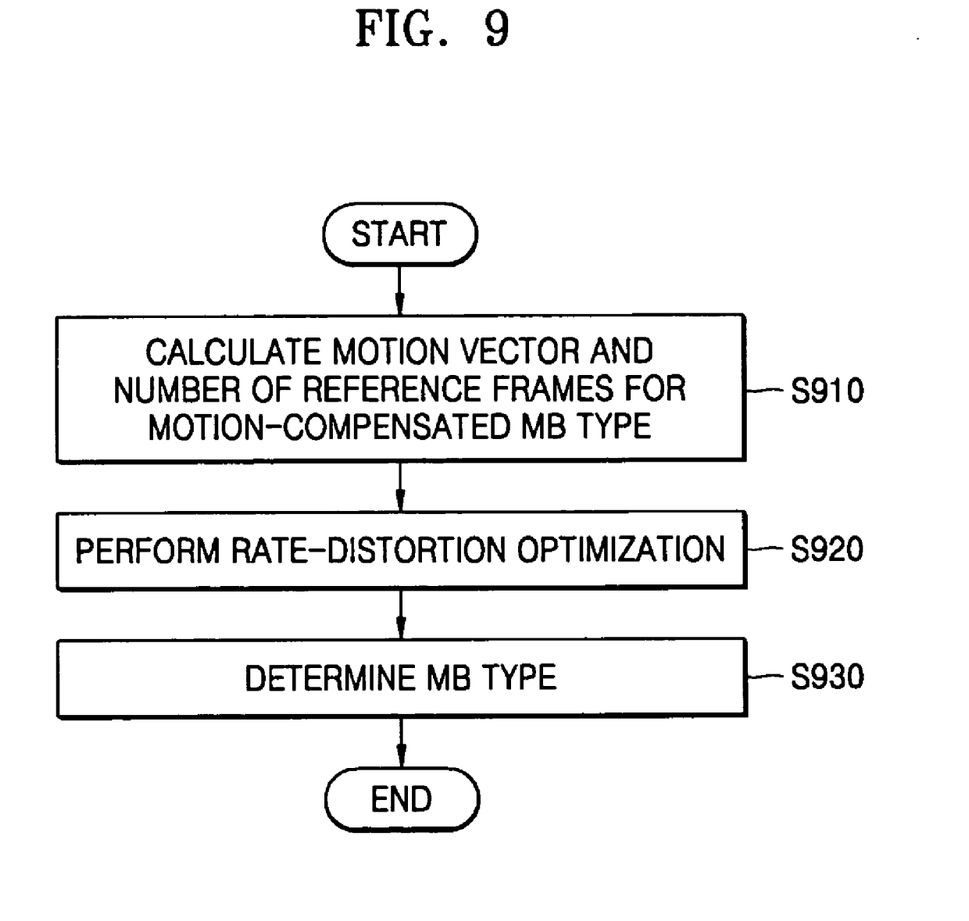
FIG. 9 is a flowchart illustrating a method of determining an optimal MB type using rate-distortion optimization combined with BAMVR according to an exemplary embodiment of the present invention.
Figure 10A:
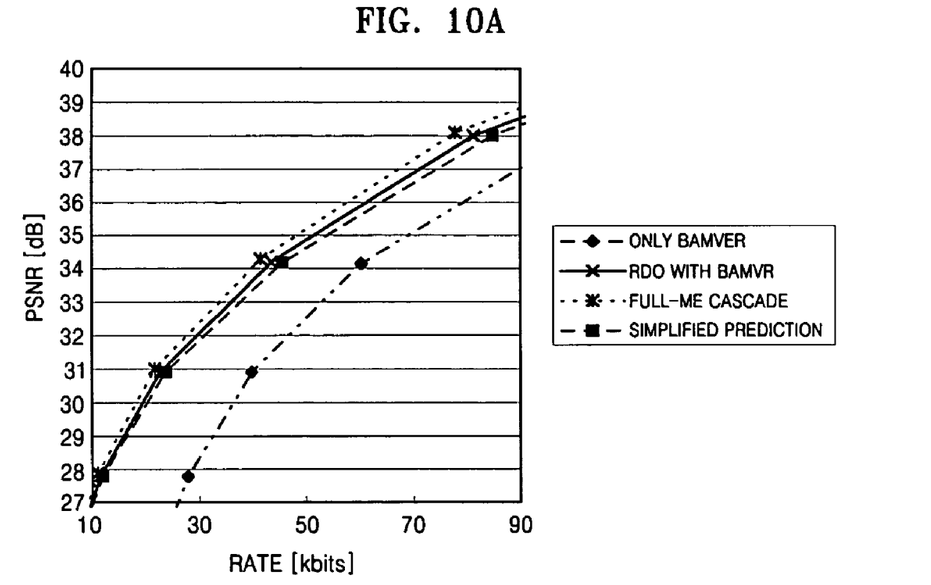
FIGS. 10A through 10D are graphs illustrating performance of the transcoder of FIG. 1.
Figure 10B:
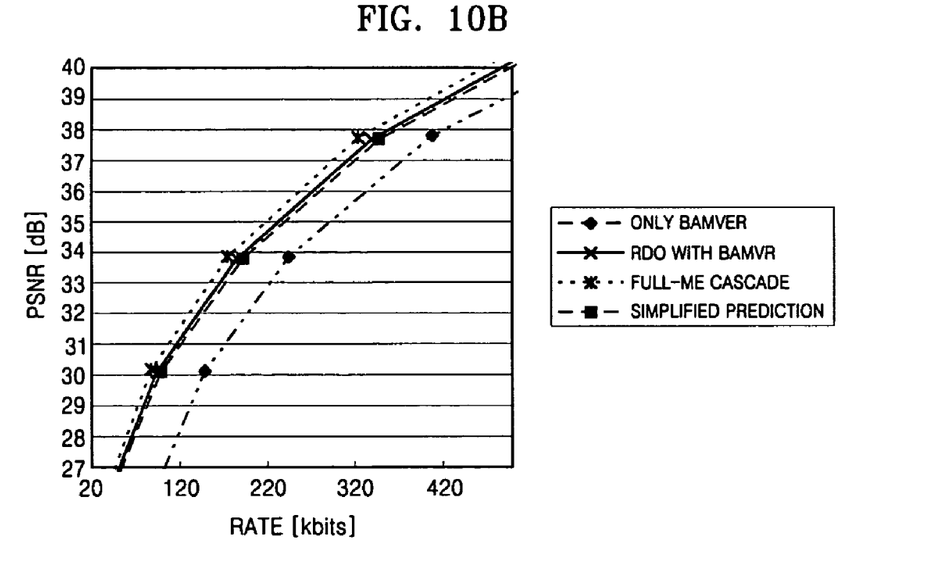
Figure 10C:
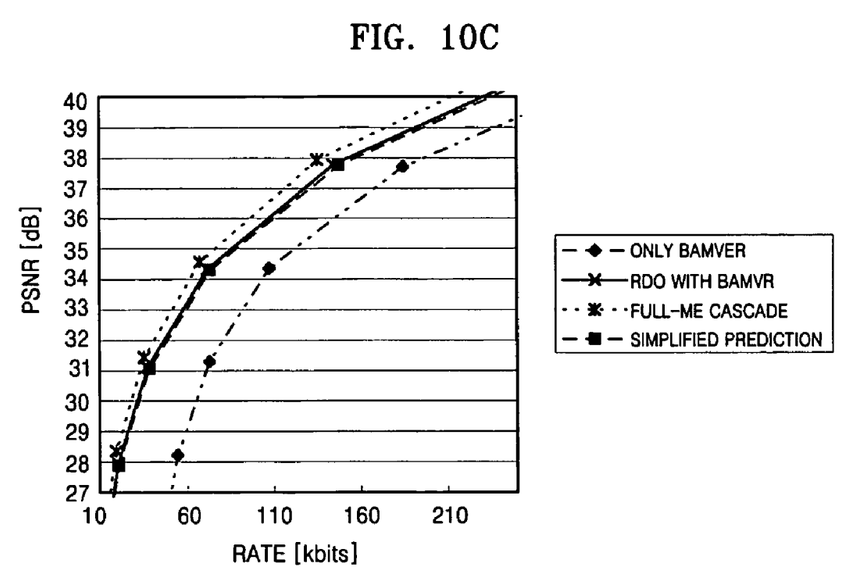
Figure 10D:
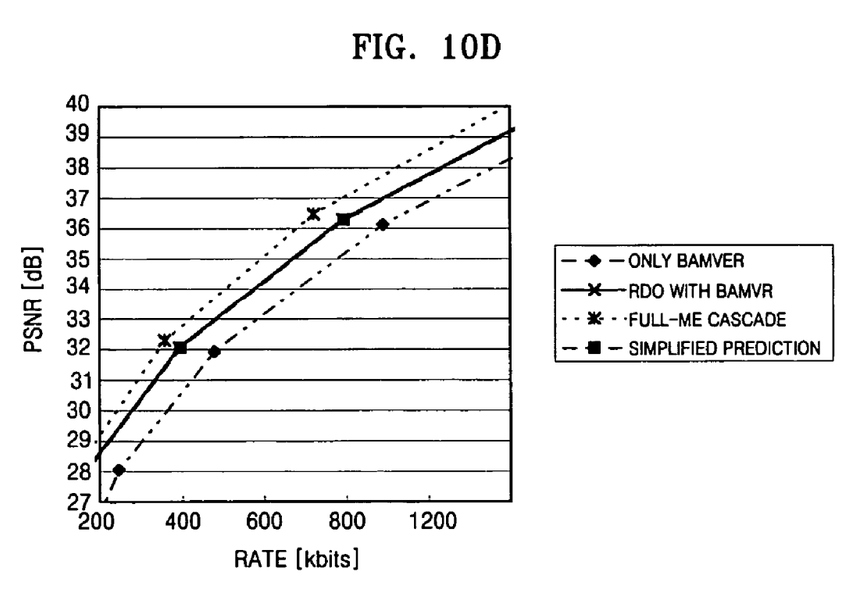

FIG. 9 is a flowchart illustrating a method of selecting the optimal MB type using rate-distortion optimization that adopts BAMVR according to an embodiment of the present invention.

The original compressed bitstreams include only one MB type selected by rate-distortion optimization. A variable MB type is allowed to select a motion vector, and a result of BAMVR of seven motion-compensated MB types and two intra MB types in Equation 7 is used to search for the rate and distortion. In step S910, the motion vector and the number of reference frames corresponding to the motion-compensated MB type are calculated. After rate-distortion optimization is performed in step S920, the optimal MB type is determined in step S930. After the optimal MB type is selected, the optimal MB type is encoded.

FIGS. 10A through 10D are graphs showing the performance of the transcoder of FIG. 1.

Transcoding according to an exemplary embodiment of the present invention is implemented by an H.264 JM4.2 video codec and performance of the video codec is tested. Input streams are streams coded using CABAC, and once variable block-based MC/ME is performed, block sizes are 16×16, 16×8, 8×16, 8×8, 8×4, 4×8, and 4×4. A motion vector search range is set to ±16, and quarter-pixel MC, 4×4 integer DCT, and rate-distortion optimization are performed.

Input bitstreams have a QP value of 10 and are compressed at 30 frame/sec. A first frame is compressed with an intra frame and remaining frames are compressed with inter frames. The intra and inter frames are preserved during transcoding. In the test, the presence of a B-frame is not considered. In FIGS. 10A through 10D, the PSNR of each of four types of images are shown. The images include a quarter common intermediate format (QCIF) Foreman image, a silent voice image, a CIF Mobile & Calendar image and a Paris image.

Referring to FIGS. 10A through 10D, when using rate-distortion optimization with BAMVR applied thereto, the PSNR is improved over only using BAMVR or using simplified prediction that does not adopt ME and is similar to that of general full-ME cascade transcoding. The PSNR difference between images with low motion such as the silent voice or Paris image is approximately 0.2 dB, but the Foreman or Mobile & Calendar image shows a drop of 0.5 dB-1 dB.

Figure 11A:
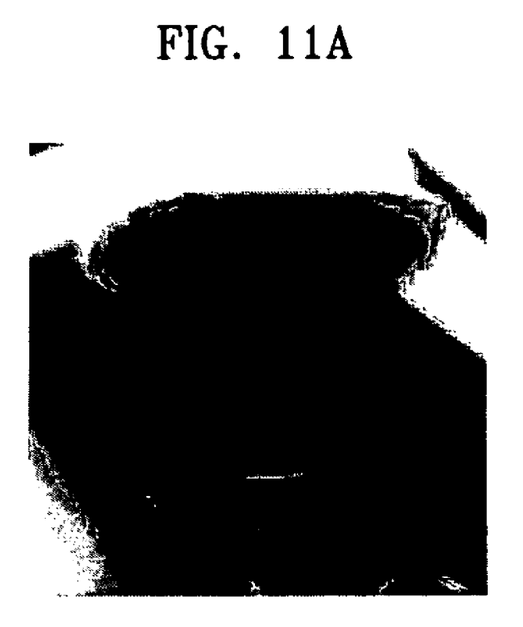
FIG. 11A illustrates a reconstructed image when an original MB type input during transcoding is used.
Figure 11B:
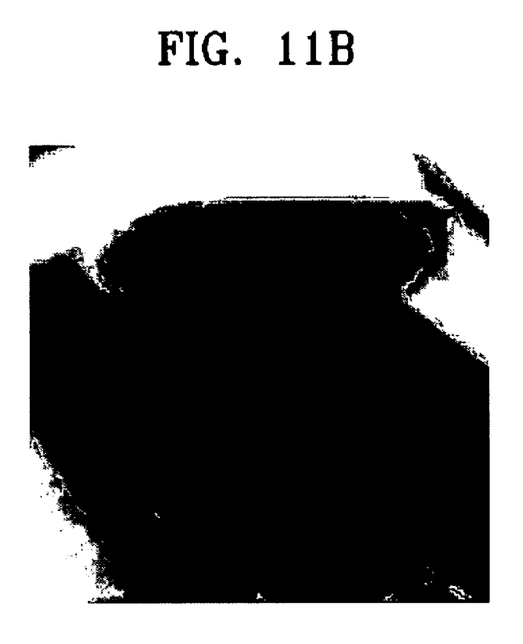
FIG. 11B illustrates a reconstructed image when rate-distortion optimization combined with BAMVR according to an exemplary embodiment of the present invention is used.

FIGS. 11A and 11B illustrate reconstructed images when the MB type input in transcoding is used and when rate-distortion optimization adopting BAMVR according to an exemplary embodiment of the present invention is used, respectively.

Referring to FIGS. 11A and 11B, even though a loop filter is used and the PNSR difference is small, an inappropriate MB type is used at a certain bitrate. As a result, the eyes and nose are blocky.

Figure 12:
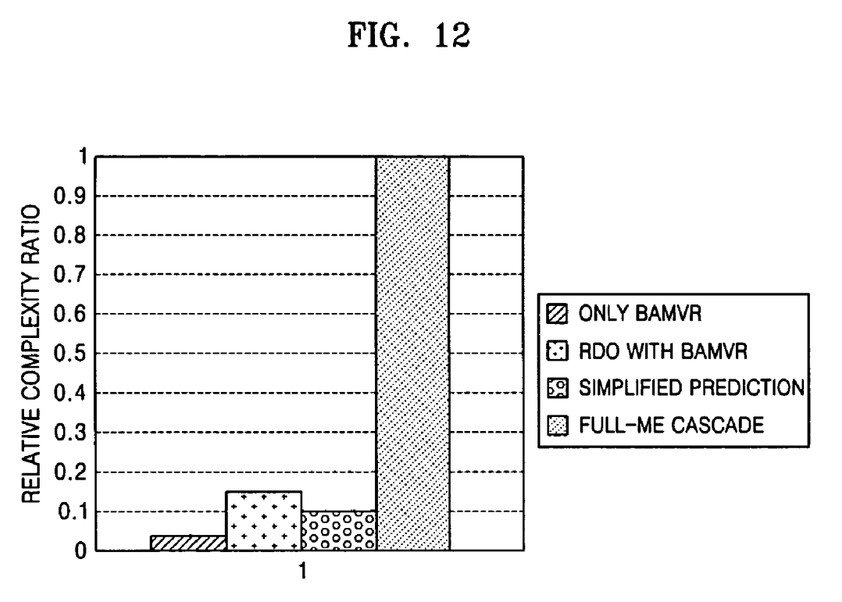
FIG. 12 is a graph showing amounts of normative computation for various methods.

FIG. 12 is a graph illustrating average amounts of computations for various methods.

Referring to FIG. 12, the amount of computation of ratio-distortion optimization to which the BAMVR according to an exemplary embodiment of the present invention is applied is about 10.5% of the full-ME cascade transcoder.

The motion vector estimation method and encoding mode determining method, as described above, are programmable as computer programs. Codes and code segments constituting the computer programs can be easily deduced by computer programmers skilled in the art. Also, the computer programs are stored on computer readable media and are read and implemented by computers, thereby implementing the motion vector estimation method and encoding mode determining method. The computer readable media include, for example, magnetic recording media, optical recording media, and carrier wave media.

Thus, according to the present invention, as described in connection with exemplary embodiments, it is possible to greatly reduce the amount of time required for transcoding without degrading visual quality.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A method of estimating a motion vector of a macroblock of a current frame in a transcoder, the method comprising:
   (a) determining whether at least one motion vector of the macroblock of the current frame is created with reference to a macroblock of a dropped frame;
   (b) if the at least one motion vector of the macroblock of the current frame is created with reference to the macroblock of the dropped frame, then estimating the at least one motion vector and the number of at least one reference frame of the macroblock of the current frame by tracing back at least one reference frame until an undropped frame is found,
   wherein the number of at least one reference frame is determined by considering the number of at least one dropped frame;
   (c) decomposing a sub-block of a predetermined size into 4×4 blocks, wherein the macroblock is composed of a plurality of sub-blocks; and
   (d) if the 4×4 blocks overlap a reference frame, searching for an overlapped sub-block of the reference frame and estimating a motion vector of each of the 4×4 blocks based on an overlapping area and motion vector information of the overlapped sub-block of the reference frame,
   wherein, in the estimating the motion vector of each of the 4×4 blocks, the motion vector of each of the 4×4 blocks is estimated based on an averaged value of motion vectors of sub-block that are overlapped by the each of the 4×4 blocks and an averaged value of overlapping areas of the overlapped sub-blocks of the reference frame.

2. The method of claim 1, wherein the transcoder performs transcoding that reduces a frame rate by dropping at least one frame.

3. A motion vector estimation method comprising:
   decomposing a sub-block of a predetermined size into 4×4 blocks, wherein a macroblock is composed of a plurality of sub-blocks; and
   if the 4×4 blocks overlap a reference frame, searching for an overlapped sub-block of the reference frame and estimating a motion vector of each of the 4×4 blocks based on an overlapping area and motion vector information of the overlapped sub-block of the reference frame,
   wherein, in the estimating the motion vector of each of the 4×4 blocks, the motion vector of each of the 4×4 blocks is estimated based on an averaged value of motion vectors of sub-block that are overlapped by the each of the 4×4 blocks and an averaged value of overlapping areas of the overlapped sub-blocks of the reference frame.

4. The motion vector estimation method of claim 3, wherein the predetermined size of the sub-block is an 8×8 block.

5. An encoding mode determining method comprising:

determining a P8×8 block type corresponding to a current macroblock; and calculating rate-distortion values of the macroblock using a 16×8 block, an 8×16 block, and a 16×16 block, comparing a calculated second rate-distortion value calculated using the determined P8×8 block type, a rate-distortion value calculated by using an intra block type, and the rate-distortion values of the macroblock using the 16×8 block, the 8×16 block, and the 16×16 block and selecting one of P8×8 block type, the intra block type, the 16×8 block type, the 8×16 block type, and the 16×16 block type, wherein the P8×8 block type includes one of a 4×4 block type, a 4×8 block type, a 8×4 block type and a 8×8 block type for each 8×8 block into which the current macroblock is decomposed, wherein the second rate-distortion value calculated using the determined P8×8 block type is determined by rate-distortion optimization using motion vectors of the 4×4, 8×4, 4×8 and 8×8 blocks, in the each 8×8 block into which the current macroblock is decomposed, and wherein the method further comprises, if the 4×4 blocks overlap a reference frame, estimating the motion vector of each 4×4 block based on an averaged value of motion vectors of sub-blocks that are overlapped by each of the 4×4 blocks and an averaged value of overlapping areas of the overlapped sub-blocks of the reference frame.

6. The encoding mode determining method of claim 5, wherein the P8×8 block type is determined by:

decomposing the macroblock into sub-blocks;

calculating a motion vector of each of the sub-blocks;

constructing the sub-blocks into 8×4, 8×4, 4×8, 16×8, 8×16, and 16×16 blocks and determining a new motion vector; and performing rate-distortion optimization in 8×8 block units and determining one P8×8 block type.

7. The encoding mode determining method of claim 6, wherein the sub-blocks are 4×4 blocks.

8. The method of claim 1, wherein the transcoder performs decoding and encoding in accordance with H.264 standards.

9. The method of claim 8, wherein block-adaptive motion vector re-sampling is performed during encoding.

* * * * *